United States Patent [19]

Pepper

[11] Patent Number: 4,929,167

[45] Date of Patent: May 29, 1990

[54] APPARATUS FOR PRODUCING A HELICAL TUBE

[76] Inventor: Kenneth V. Pepper, Rte. 3, Pamela La., Plymouth, Wis. 53073

[21] Appl. No.: 219,885

[22] Filed: Jul. 11, 1988

Related U.S. Application Data

[63] Continuation of Ser. No. 62,534, Jun. 12, 1987, abandoned.

[51] Int. Cl.$^5$ ............................................. B29C 53/08
[52] U.S. Cl. ..................................... 425/325; 72/137;
198/624; 264/209.4; 264/281; 264/295;
264/DIG. 40; 425/335; 425/392
[58] Field of Search ............. 425/325, 327, 335, 392;
198/624; 264/177.17, 209.3, 209.4, 209.8, 210.2,
281, 568, 209.1, 209.5, DIG. 40, 295, 210.5;
72/135–137, 142, 145; 428/36, 36.9

[56] References Cited

U.S. PATENT DOCUMENTS

| | | | |
|---|---|---|---|
| T873,007 | 4/1970 | Bennett et al. | 264/209.1 X |
| 1,217,101 | 2/1917 | Merritt et al. | 72/137 |
| 1,584,283 | 5/1926 | Fraser | 264/281 X |
| 2,039,475 | 5/1936 | Campbell | 264/281 X |
| 2,603,343 | 7/1952 | Payne | 198/624 X |
| 2,728,104 | 12/1955 | Fisch | 264/177.17 |
| 3,207,827 | 9/1965 | Kuehnle | 264/281 X |
| 3,274,313 | 9/1966 | Harp, Jr. | 264/209.3 X |
| 3,296,661 | 1/1967 | Moustier | 264/209.5 X |
| 3,331,488 | 7/1967 | Wellman | 198/624 |
| 3,454,695 | 7/1969 | Holmgren | 264/281 X |
| 3,646,793 | 3/1972 | Teraoka | 72/137 |
| 3,825,641 | 7/1974 | Barnett | 264/568 X |
| 3,873,399 | 3/1975 | Goldsworthy et al. | 264/281 X |
| 3,889,798 | 6/1975 | Jurgens et al. | 198/624 |
| 3,950,469 | 4/1976 | Gneuss et al. | 264/209.8 X |
| 4,036,930 | 7/1977 | Murai et al. | 264/209.8 X |
| 4,157,235 | 6/1979 | Lagabe et al. | 425/325 X |
| 4,182,738 | 1/1980 | Casaert et al. | 264/281 X |
| 4,273,523 | 6/1981 | Levens | 264/209.4 X |
| 4,359,446 | 11/1982 | Levens | 264/568 |
| 4,388,061 | 6/1983 | Bebok | 425/392 |

FOREIGN PATENT DOCUMENTS

| | | | |
|---|---|---|---|
| 2359746 | 6/1974 | Fed. Rep. of Germany | 264/295 |
| 2362465 | 6/1975 | Fed. Rep. of Germany | 264/295 |
| 4076 | 2/1967 | Japan . | |
| 52174 | 4/1979 | Japan . | |
| 179320 | 10/1984 | Japan | 264/209.3 |
| 62-51503 | 3/1987 | Japan | 198/624 |
| 17797 | of 1888 | United Kingdom | 264/281 |

Primary Examiner—Richard L. Chiesa

[57] ABSTRACT

An apparatus for producing a curved tube, the apparatus comprising an extruder for extruding a tube having a wall including a first portion having a thickness, and a second portion diametrically opposite the first portion and having a thickness less than the thickness of the first portion, and rollers for forming the tube into a curve with the first portion being radially outward and with the second portion being radially inward so that the thickness of the first portion becomes substantially equal to the thickness of the second portion.

11 Claims, 2 Drawing Sheets

U.S. Patent May 29, 1990 Sheet 1 of 2 4,929,167
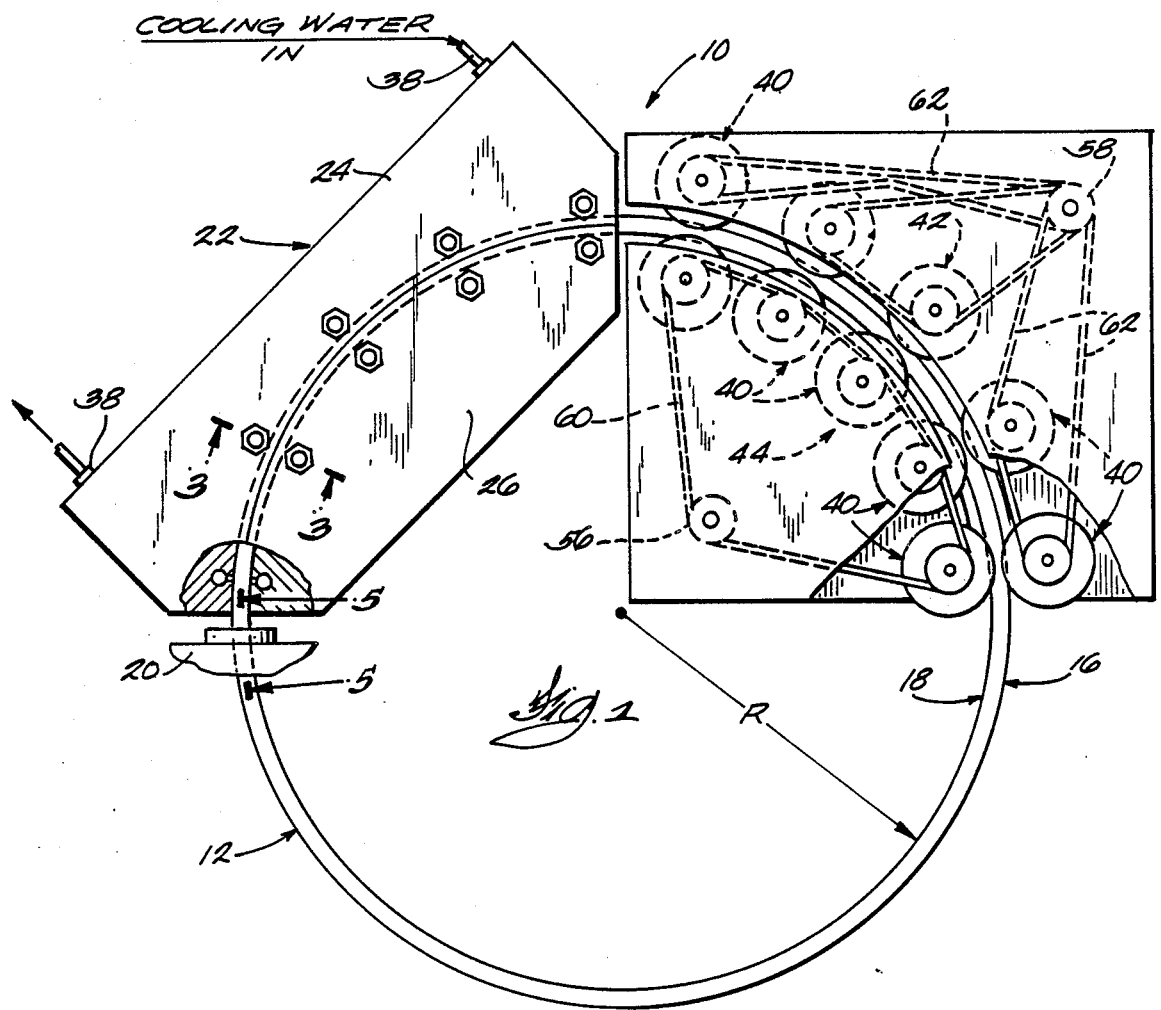
Fig. 1
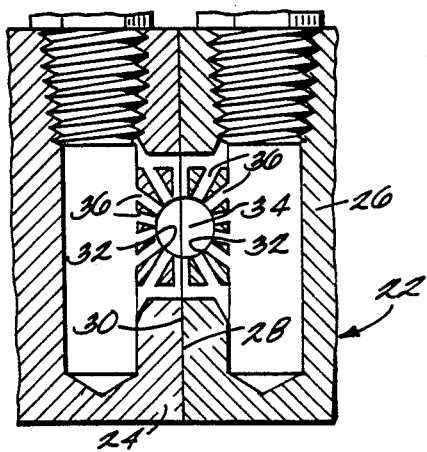
Fig. 3
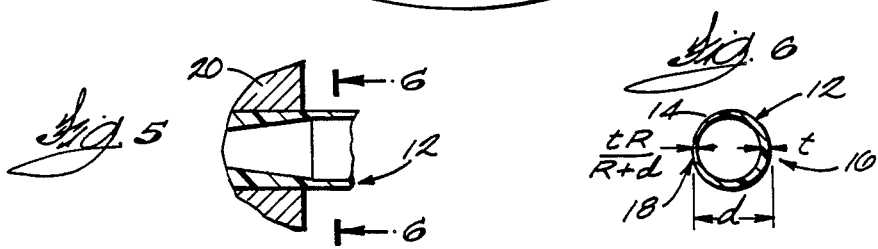
Fig. 5
Fig. 4
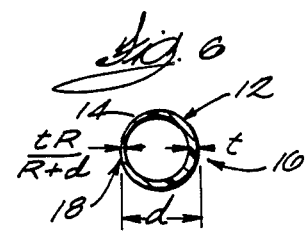
Fig. 6

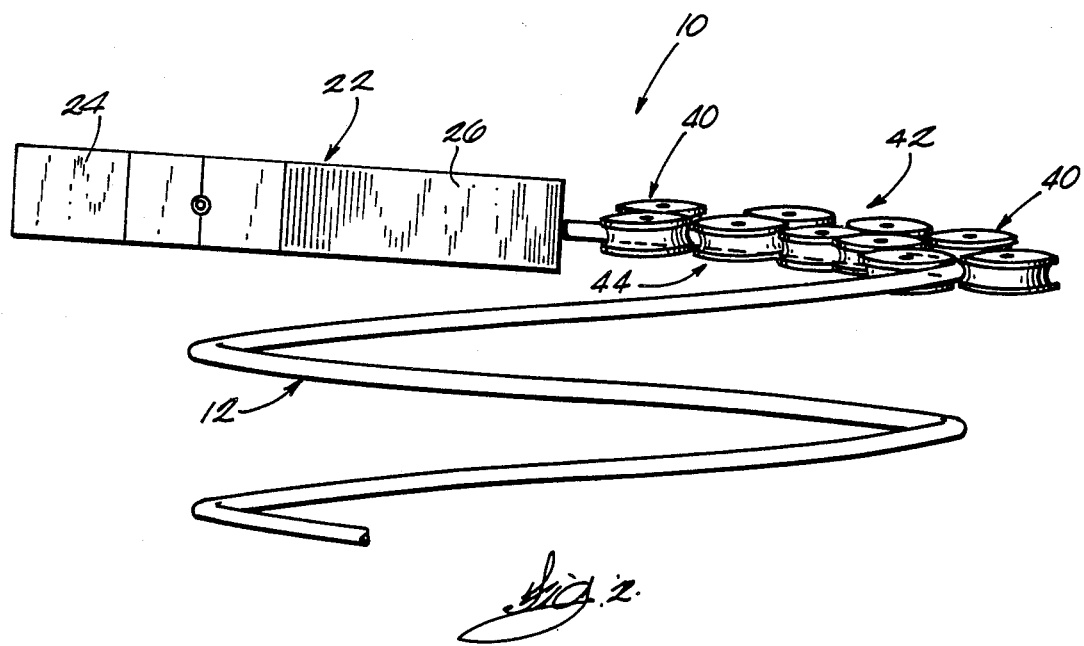

APPARATUS FOR PRODUCING A HELICAL TUBE

RELATED APPLICATION

This application is a continuation of application Ser. No. 062,534, filed June 12, 1987, and now abandoned.

BACKGROUND OF THE INVENTION

It is well known that a metal or plastic tube can be extruded in a straight length and subsequently coiled into a helix. However, when a tube is thus bend or coiled, the developed length of the radially outer portion of the tube wall will of necessity be greater than the length of the radially inner portion. Unless special precautions are taken, the conflict between these dimensions is at least partially solved by collapsing of the tube.

As an example, if a 1" outer diameter tube ($d=1''$) is bent through 360° with a 12" inner radius ($R=12''$), the developed length of the inside wall of the tube will be 75.398" ($2\pi R$), and that of the outer wall will be 81.681" ($2\pi(R+d)$), a difference of 6.283". In a ductile metal tube this can to some degree be accommodated by stretching the outer wall and perhaps compressing the inner wall. In order to support the tube bore against collapse during the forming and stretching process, a coiled pipe-bending spring may be inserted into the tube bore, or the bore may be filled with a low melting, solder-like alloy. Furthermore, the inner form against which the tube is pressed and bent may be grooved to one-half the diameter of the tube in order to give passive support to the tube.

The above-mentioned methods do not work well with plastic tubes, because such stretching of the outer radius as may be achieved is usually within the elastic limits of the material. Consequently, when the tube is released from the bending device, it immediately springs back to its original straightness, although some slight curvature may be retained.

Attention is directed to the following U.S. patents:
Bennett, et al. T873,007; Apr. 14, 1970
Fraser 1,584,283; May 11, 1926
Campbell 2,039,475; May 5, 1936
Moustier 3,296,661; Jan. 10, 1967
Kuehnle 3,207,827; Sep. 21, 1965
Harp, Jr. 3,274,313; Sep. 20, 1966
Holmgren 3,454,695; Jul. 8, 1969
Bernett 3,825,641; Jul. 23, 1974
Goldsworthy, et al. 3,873,399; Mar. 25, 1975
Casaert, et al. 4,182,738; Jan. 8, 1980
Levens 4,273,523; Jun. 16, 1981
Levens 4,359,446; Nov. 16, 1982

Attention is also directed to the following foreign patents: Great Britain Patent No. 17,797; Japanese Patent No. 54-52174; Japanese Patent No. 59-179320; and Japanese Patent No. 42-4076.

SUMMARY OF THE INVENTION

The invention provides an apparatus for producing a thin-walled, plastic tube having a cross sectional diameter d and forming a helix having an inner radius of curvature R.

The apparatus comprises an extruder for forming a circular tube having a cross-sectional diameter d. The extruder includes means for adjusting the concentricity of the tube bore. The adjusting means is set so that the extruder produces a tube having a first circumferential portion with a thickness t, and a second circumferential portion diametrically opposite the first circumferential portion and with a thickness $tR/(R+d)$.

The apparatus also comprises means for forming the tube into a helix having an inner radius of curvature R, with the first portion of the tube being radially outward and with the second portion of the tube being radially inward, so that the thickness of the first portion becomes equal to the thickness of the second portion. When the tube is formed into the helix, the length of the first portion of the tube will become equal to $(R+d)/R$ times its original length, which is equal to the length of the second portion. This stretching of the first portion will reduce its thickness by a factor of $R/(R+d)$, so that the thickness of the first portion will become $tR/(R+d)$, which is equal to the thickness of the second portion.

The forming means includes a sizing and cooling sleeve located immediately adjacent the extruder, so that the tube is curved before it hardens. The sleeve has a circular passage with an inner radius of curvature R. The forming means also includes rollers for pulling the tube through the sleeve and for moving the tube along the path of the helix. The rollers include a first series of rollers aligned along the path of the helix and engaging the first or radially inward portion of the tube, and a second series of rollers aligned along the path of the helix and engaging the second or radially outward portion of the tube. Ideally, the speed of each portion of the tube should vary in proportion to its radial distance from the center of the helix. Because of the different radial distances of the radially inward and outward portions of the tube, the first series is driven at a rotational speed s, and the second series is driven at a rotational speed $s(R+d)/R$.

Each roller has a circumferentially extending groove receiving the associated portion of the tube. To avoid undesired stresses on the tube because a portion of the roller is not moving at the ideal speed for the associated portion of the tube, only a small portion of the roller is used to drive the tube. Therefore, the groove has a radially innermost portion defined by a central portion of the roller having a high coefficient of friction, and a radially outer portion defined by opposed side walls of the roller having a low coefficient of friction. The central portion of the roller drives the tube, and the side walls slideably engage the tube and retain it within the groove.

Forming the tube as a helix permits the process to be continuous. Since the tube is inclined as well as circular, it does not circle back on itself or on the extruder.

Various features, aspects and advantages of the invention will become apparent to those skilled in the art upon reviewing the following detailed description, the drawings and the appended claims.

DESCRIPTION OF THE DRAWINGS

FIG. 1 is a plan view of an apparatus embodying various features of the invention.

FIG. 2 is an elevational view of the apparatus.

FIG. 3 is an enlarged view taken along line 3—3 in FIG. 1.

FIG. 4 is an enlarged view taken along line 4—4 in FIG. 1.

FIG. 5 is an enlarged view taken along line 5—5 in FIG. 1.

FIG. 6 is an enlarged view taken along line 6—6 in FIG. 5.

Before one embodiment of the invention is explained in detail, it is to be understood that the invention is not limited in its application to the details of construction and the arrangements of components set forth in the following description or illustrated in the drawings. The invention is capable of other embodiments and of being practiced or being carried out in various ways. Also, it is to be understood that the phraseology and terminology used herein is for the purpose of description and should not be regarded as limiting.

DESCRIPTION OF THE PREFERRED EMBODIMENT

An apparatus 10 embodying the invention is illustrated in the drawings. The apparatus 10 produces a curved tube, preferably a thin-walled, circular plastic tube having a cross sectional diameter d and forming a helix having an inner radius of curvature R. In alternative embodiments, the tube can have other forms, e.g., can be square, and can be curved but not helical.

The apparatus 10 comprises means for extruding a tube 12 having a cross sectional diameter (or dimension along a radius of the curve or helix) d. The tube 12 also has an endless wall 14 including a first circumferential portion 16 having a thickness t, and a second circumferential portion 18 diametrically opposite the first portion 16 and having a thickness approximately equal to $tR/(R+d)$. It should be understood that the words "diametrically opposite" are not intended to limit the tube 12 to being circular, although that is the case in the preferred embodiment.

While various suitable extruding means can be employed, in the preferred embodiment, this means includes an extruder 20 (shown in part in FIG. 1) for forming a circular tube and including means for adjusting the concentricity of the bore of the tube. As shown in FIGS. 5 and 6, the adjustment means is set to produce an eccentric bore so that the tube wall 14 is formed as described above.

The apparatus 10 also comprises means for forming the tube 12 into a curve having an inner radius of curvature R, with the first portion 16 of the tube 12 being radially outward, and with the second portion 18 of the tube 12 being radially inward, so that the thickness of the first portion 16 becomes substantially equal to the thickness of the second portion 18. (The stretching of the first portion 16 when the tube 12 is curved will cause the thickness of the first portion 16 to be reduced by a factor of $R/(R+d)$, so that the thickness of the first portion 16 will be $tR/(R+d)$, which is equal to the thickness of the second portion 18.)

While various suitable forming means can be used, in the illustrated construction, the forming means forms the tube 12 into a helix and includes a sizing and cooling sleeve 22 located immediately adjacent the extruder 20 so that the tube 12 is still molten when it enters the sleeve. As shown in Figs. 2 and 3, the sleeve 22 includes mating halves 24 and 26 with respective arcuate mating surfaces 28 and 30 having therein semicircular grooves 32 and having a radius of curvature R. The grooves 32 have radii equal to the cross sectional radius of the tube 12 and, when the surfaces 28 and 30 mate, cooperate to form a circular passage 34 having an inner radius of curvature R. The sleeve halves 24 and 26 are preferably made of a heat conducting metal such as brass or aluminum, and are separable, for reasons explained hereinafter. For sizing the tube 12, the sleeve 22 includes vacuum passages 36 (FIG. 3) communicating with the grooves 32 and communicable with a vacuum source (not shown). The vacuum causes the tube 12 to expand and cling to the walls of the passage 34. For cooling the tube 12 and the sleeve, the sleeve 22 includes cooling water passages 38.

The forming means also includes a plurality of rollers 40 aligned along the path of the helix for pulling the tube 12 through the sleeve 22 and for moving the tube along the path of the helix. In the preferred embodiment, as shown in FIG. 2, the rollers 40 are inclined downwardly away from the sleeve 22. The rollers 40 are driven by means described hereinafter. The rollers 40 include a first series 42 engaging the first or radially outward portion 16 of the tube 12, and a second series 44 engaging the second or radially inward portion 18 of the tube 12.

As shown in FIG. 4, each roller 40 has therein a circumferentially extending groove 46 receiving the tube 12 and having a cross sectional radius substantially equal to the cross sectional radius of the tube 12. It should be understood that in alternative embodiments, the rollers 40 need not have therein circumferentially extending grooves. However, in the preferred embodiment, the tube 12 is thin walled, and the grooves 46 are necessary to support the tube 12 and prevent its collapse.

Just as the speed of a portion of the tube 12 varies in proportion to its radial distance from the center of the helix, the speed of a portion of a roller 40 varies in proportion to its radial distance from the center of the roller 40. Therefore, the portion of the roller 40 defining the bottom of the groove 46 does not move as fast as the portion of the roller 40 defining the outside of the groove 46. Thus, referring to FIG. 4, the portion of the right or outer roller 40 engaging the right or radially outward portion 16 of the tube 12 is moving slower than the portion of the outer roller 40 engaging the center of the tube 12. However, as explained previously, the center of the tube 12 should move slower than the radially outward portion 16 of the tube 12. A similar problem arises with the inner or left roller 40, although not to the same extent. While the speed of the inner roller 40 increases from left to right (referring to FIG. 4), as does the speed of the tube 12, the increase is not at the same rate, because the radius of the roller 40 is not the same as the radius of the tube 12. Accordingly, only one portion of the roller 40 can move at the same speed as the associated portion of the tube 12.

This problem is solved by having only the bottom of the groove 46 drivingly engage the tube 12, and by having the remainder of the groove 46 slide relative to the tube 12. Accordingly, the central portion 48 of the roller 40, which defines the radially innermost or bottom portion of the groove 46, has a relatively high coefficient of friction, and the opposed side walls 50 of the roller 40, which define the radially outer portion of the groove 46, have a relatively low coefficient of friction. The central portion 48 drivingly engages the tube 12, and the side walls 50 slideably engage the tube 12 and retain the tube 12 in the groove 46. Preferably, each roller 40 is laminated and includes two outer discs 52 and an inner disc 54 sandwiched between the outer discs 52. The outer discs 52 have a low coefficient of friction and form the side walls 50, and the inner disc 54 has a high coefficient of friction and forms the central portion 48. Preferably, the outer discs 52 are made of polyacetal resin, and the inner disc 54 is made of hard rubber.

The forming means also includes means for rotating the rollers 40. Because of the different speeds of the radially inner and outer portions of the tube 12, this means rotates the first series 42 of rollers 40 at a first rotational speed s, and rotates the second series 44 of rollers at a second rotational speed SR/(R+d). While various suitable rotating means can be used, in the illustrated construction, this means includes variable speed motors 56 and 58. The motor 56 is drivingly connected to the inner series 44 of rollers 40 by a belt 60, and the motor 58 is drivingly connected to the outer series 42 of rollers 40 by belts 62.

Operation of the apparatus 10 is started as follows. With the sleeve halves 24 and 26 separated, a length of tube 12 longer than the length of the sleeve passage 34 is extruded. The sleeve halves 24 and 26 are then moved together to enclose the tube 12 within the passage 34, with the end of the tube 12 extending from the sleeve 22. This end of the tube 12 is inserted between the rollers 40. Finally, the extruder 20 and the rollers 40 are activated, so that the rollers 40 pull the tube 12 through the cooling and sizing sleeve 22 and carry the tube 12 along the path of the helix.

Various features of the invention are set forth in the following claims.

I claim:

1. Apparatus for producing a curved tube, said apparatus comprising means for extruding a tube having a wall including a first portion having a thickness, and a second portion diametrically opposite said first portion and having a thickness less than the thickness of said first portion, and means for forming said tube into a curve with said first portion being radially outward and with said second portion being radially inward so that the thickness of said first portion becomes substantially equal to the thickness of said second portion, said forming means including a plurality of rollers aligned along said curve, each of said rollers having therein a circumferentially extending groove receiving said tube, said groove having a radially innermost portion having a relatively high coefficient of friction, and said groove having a radially outer portion defined by opposed side walls extending radially outwardly from said radially innermost portion of said roller and having a relatively low coefficient of friction, so that said radially innermost portion of said roller drivingly engages said tube and said side walls slidably engage said tube and retain said tube within said groove, and means for rotating said rollers.

2. An apparatus as set forth in claim 1 wherein each of said rollers includes two outer discs and an inner disc sandwiched between said outer discs, said outer discs having a relatively low coefficient of friction and said inner disc having a relatively high coefficient of friction.

3. An apparatus for producing a helical tube, said apparatus comprising means for extruding a tube having a wall including a first portion having a thickness, and a second portion diametrically opposite said first portion and having a thickness less than the thickness of said first portion, and means for forming said tube into a helix centered about an axis with said first portion being radially outward relative to said axis and with said second portion being radially inward relative to said axis so that the thickness of said first portion becomes substantially equal to the thickness of said second portion, said forming means including a sizing a cooling sleeve, a first series of rollers aligned along the path of said helix and engaging said second portion of said tube for moving said tube along the path of said helix, and a second series of rollers aligned along the path of said helix and engaging said second portion of said tube for moving said tube along the path of said helix, each of said rollers of said first and second series having therein a circumferentially extending groove receiving said tube, said groove having a radially innermost portion having a relatively high coefficient of friction, and said groove having a radially outer portion defined by opposed side walls extending radially outwardly from said radially innermost portion of said roller and having a relatively low coefficient of friction, so that said radially innermost portion of said roller drivingly engages said tube and said side walls slidably engage said tube and retain said tube within said groove, means for rotating said first series of rollers at a first rotational speed, and means for rotating said second series of rollers at a second rotational speed slower than said first rotational speed.

4. An apparatus as set forth in claim 3 wherein each of said rollers includes two outer discs and an inner disc sandwiched between said outer discs, said outer discs having a relatively low coefficient of friction and said inner disc having a relatively high coefficient of friction.

5. An apparatus in accordance with claim 3 wherein said tube is extruded in a molten state, and wherein said forming means forms said tube into said curve before said tube hardens.

6. An apparatus in accordance with claim 3 wherein said forming means is located immediately adjacent said extruding means.

7. An apparatus for producing a tube, said apparatus comprising means for extruding a tube, and means for moving said tube away from said extruding means and including a roller having therein a circumferentially extending groove receiving said tube, said groove having a radially innermost portion having a relatively high coefficient of friction, and said groove having a radially outer portion defined by opposed side walls extending radially outwardly from said radially innermost portion of said roller and having a relatively low coefficient of friction, and means for rotating said roller so that said radially innermost portion of said roller drivingly engages said tube and said side walls slidably engage said tube and retain said tube within said groove.

8. An apparatus as set forth in claim 7 wherein said roller includes two outer discs and an inner disc sandwiched between said outer discs, said outer discs having a relatively low coefficient of friction and said inner disc having a relatively high coefficient of friction.

9. An apparatus as set forth in claim 7 wherein said moving means moves said tube along an arcuate path so that said tube has a first, radially outward portion and a second, radially inward portion, and wherein said moving means includes a first series of rollers aligned along said path and engaging said first portion of said tube for moving said tube along said path, a second series of rollers aligned along said path and engaging said second portion of said tube for moving said tube along said path, means for rotating said first series of rollers at a first rotational speed, and means for rotating said second series of rollers at a second rotational speed slower than said first rotational speed.

10. An apparatus for conveying an elongate object, said apparatus comprising a roller having therein a circumferentially extending groove positioned to receive the object, said groove having a radially innermost portion having a relatively high coefficient of friction, and said groove having a radially outer portion defined by opposed side walls extending radially outwardly from said radially innermost portion of said roller and having a relatively low coefficient of friction, and means for rotating said roller so that said radially innermost portion of said roller drivingly engages the object and said side walls slidably engage the object and retain the object within said groove.

11. An apparatus as set forth in claim 10 wherein said roller includes two outer discs and an inner disc sandwiched between said outer discs, said outer discs having a relatively low coefficient of friction and said inner disc having a relatively high coefficient of friction.

* * * * *